United States Patent
Florek et al.

(10) Patent No.: US 9,081,997 B2
(45) Date of Patent: Jul. 14, 2015

(54) METHOD OF COMMUNICATION WITH THE POS TERMINAL, THE FREQUENCY CONVERTER FOR THE POST TERMINAL

(75) Inventors: Miroslav Florek, Bratislava (SK); Michal Masaryk, Bratislava (SK)

(73) Assignee: Logomotion, S.R.O. (SK)

( * ) Notice: Subject to any disclaimer, the term of this patent is extended or adjusted under 35 U.S.C. 154(b) by 0 days.

(21) Appl. No.: 12/747,359

(22) PCT Filed: Oct. 11, 2009

(86) PCT No.: PCT/IB2009/054457
§ 371 (c)(1),
(2), (4) Date: Jun. 10, 2010

(87) PCT Pub. No.: WO2010/044041
PCT Pub. Date: Apr. 22, 2010

(65) Prior Publication Data
US 2010/0262503 A1    Oct. 14, 2010

(30) Foreign Application Priority Data
Oct. 15, 2008    (SK) .................................. 5093-2008

(51) Int. Cl.
*G06Q 20/00* (2012.01)
*G06K 7/00* (2006.01)
*G06K 19/07* (2006.01)
*G06Q 20/20* (2012.01)
(Continued)

(52) U.S. Cl.
CPC .......... *G06K 7/0008* (2013.01); *G06K 19/0723* (2013.01); *G06Q 20/204* (2013.01)

(58) Field of Classification Search
USPC ...................................... 705/16–18, 21, 27.1
See application file for complete search history.

(56) References Cited

U.S. PATENT DOCUMENTS

| 5,574,470 A | 11/1996 | de Vall |
| 5,608,417 A | 3/1997 | de Vall |

(Continued)

FOREIGN PATENT DOCUMENTS

| CN | 1450782 | 10/2003 |
| CN | 1627321 | 6/2005 |

(Continued)

OTHER PUBLICATIONS

Bluetooth Wikipedia, http://en.wikipedia.org/wiki/Bluetooth.*
(Continued)

*Primary Examiner* — Ig T An
(74) *Attorney, Agent, or Firm* — Baker & Hostetler LLP

(57) ABSTRACT

The communication method with the POS terminal that improves transmission characteristics of the authorized payment from the mobile communication device (9) is based upon a fact that the frequency converter (1) on that side of the communication channel where the POS terminals NFC antenna (8) is. The frequency converter (1) receives and processes the signal from the POS terminals NFC antenna (8) on the 13.56 MHz frequency, sends it on a higher frequency into the mobile communication device (9) and vice versa. The frequency converter (1) is outwardly energetically passive and is power supplied from the electromagnetic field received from the POS terminals antenna (8). The frequency converter (1) contains an antenna, tuned to the frequency in the range of 13.00 to 14.00 MHz, that is connected to the power supply element (4). The frequency converter (1) is located in the proximity of the POS terminal's antenna.

9 Claims, 3 Drawing Sheets

(51) Int. Cl.
*G06G 1/12* (2006.01)
*G06Q 30/00* (2012.01)

(56) References Cited

U.S. PATENT DOCUMENTS

| | | |
|---|---|---|
| 6,062,472 A | 5/2000 | Cheung |
| 6,070,795 A | 6/2000 | Feiken |
| 6,070,796 A | 6/2000 | Sirbu |
| 6,450,407 B1 | 9/2002 | Freeman et al. |
| 6,615,243 B1 | 9/2003 | Megeid et al. |
| 6,745,935 B1 | 6/2004 | Grieu et al. |
| 6,828,670 B2 | 12/2004 | Hayama et al. |
| 6,976,011 B1 | 12/2005 | Capitant et al. |
| 7,051,429 B2 | 5/2006 | Kerr et al. |
| 7,364,092 B2 | 4/2008 | Narendra et al. |
| 7,374,100 B2 | 5/2008 | Jei et al. |
| 7,436,965 B2 | 10/2008 | Sherman |
| 7,458,518 B2 | 12/2008 | Fukuda et al. |
| 7,481,358 B2 | 1/2009 | Honjo et al. |
| 7,568,065 B2 | 7/2009 | D'Athis |
| 7,581,678 B2 | 9/2009 | Narendra et al. |
| 7,689,932 B2 | 3/2010 | Maktedar |
| 7,775,442 B2 | 8/2010 | Saarisalo |
| 7,775,446 B2 | 8/2010 | Ochi et al. |
| 7,805,615 B2 | 9/2010 | Narendra et al. |
| 7,828,214 B2 | 11/2010 | Narendra et al. |
| 8,055,184 B1* | 11/2011 | Dimartino et al. ............ 455/1 |
| 8,127,999 B2 | 3/2012 | Diamond |
| 8,355,670 B2 | 1/2013 | White |
| 2001/0005832 A1* | 6/2001 | Cofta ............ 705/17 |
| 2002/0062249 A1 | 5/2002 | Iannacci |
| 2002/0147658 A1 | 10/2002 | Kwan |
| 2002/0163479 A1 | 11/2002 | Lin |
| 2003/0055738 A1 | 3/2003 | Alie |
| 2003/0138135 A1 | 7/2003 | Chung et al. |
| 2004/0066278 A1 | 4/2004 | Hughes et al. |
| 2004/0087339 A1 | 5/2004 | Goldthwaite et al. |
| 2004/0127256 A1 | 7/2004 | Goldthwaite et al. |
| 2005/0011960 A1 | 1/2005 | Koike et al. |
| 2005/0072595 A1 | 4/2005 | Cho |
| 2005/0092835 A1 | 5/2005 | Chung et al. |
| 2005/0116050 A1 | 6/2005 | Jei et al. |
| 2005/0125745 A1 | 6/2005 | Engestrom |
| 2005/0222949 A1 | 10/2005 | Inotay et al. |
| 2005/0269401 A1 | 12/2005 | Spitzer et al. |
| 2005/0269402 A1 | 12/2005 | Spitzer et al. |
| 2006/0083955 A1* | 4/2006 | Kanouda et al. ............ 429/9 |
| 2006/0143578 A1 | 6/2006 | Maktedar |
| 2006/0146023 A1 | 7/2006 | Kidron |
| 2006/0152288 A1* | 7/2006 | Peng et al. ............ 330/311 |
| 2006/0186209 A1 | 8/2006 | Narendra et al. |
| 2006/0219776 A1 | 10/2006 | Finn |
| 2006/0224470 A1 | 10/2006 | Garcia et al. |
| 2006/0226217 A1 | 10/2006 | Narendra et al. |
| 2006/0255160 A1 | 11/2006 | Winkler |
| 2007/0014407 A1 | 1/2007 | Narendra et al. |
| 2007/0014408 A1 | 1/2007 | Narendra et al. |
| 2007/0016957 A1 | 1/2007 | Seaward et al. |
| 2007/0050871 A1 | 3/2007 | Mashhour |
| 2007/0083772 A1 | 4/2007 | Harada et al. |
| 2007/0106564 A1 | 5/2007 | Matotek et al. |
| 2007/0125840 A1 | 6/2007 | Law et al. |
| 2007/0152035 A1 | 7/2007 | Adams et al. |
| 2007/0158438 A1 | 7/2007 | Fukuda et al. |
| 2007/0171079 A1 | 7/2007 | Saito |
| 2007/0192840 A1 | 8/2007 | Pesonen |
| 2007/0233615 A1 | 10/2007 | Tumminaro |
| 2007/0235539 A1 | 10/2007 | Sevanto et al. |
| 2007/0241180 A1 | 10/2007 | Park et al. |
| 2007/0278290 A1 | 12/2007 | Messerges et al. |
| 2007/0293155 A1 | 12/2007 | Liao |
| 2008/0011833 A1 | 1/2008 | Saarisalo |
| 2008/0048036 A1 | 2/2008 | Matsumoto et al. |
| 2008/0051122 A1* | 2/2008 | Fisher ............ 455/466 |
| 2008/0059375 A1 | 3/2008 | Abifaker |
| 2008/0093467 A1 | 4/2008 | Narendra et al. |
| 2008/0111756 A1 | 5/2008 | Ochi et al. |
| 2008/0120129 A1 | 5/2008 | Seubert et al. |
| 2008/0129629 A1 | 6/2008 | Kimura et al. |
| 2008/0207124 A1 | 8/2008 | Raisanen et al. |
| 2008/0233906 A1 | 9/2008 | Mitomo et al. |
| 2008/0250244 A1 | 10/2008 | Baentsch et al. |
| 2008/0270246 A1 | 10/2008 | Chen |
| 2009/0013418 A1 | 1/2009 | Okabe et al. |
| 2009/0063312 A1 | 3/2009 | Hurst |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0088077 A1 | 4/2009 | Brown et al. |
| 2009/0098825 A1 | 4/2009 | Huomo et al. |
| 2009/0108063 A1* | 4/2009 | Jain et al. ............ 235/380 |
| 2009/0119190 A1 | 5/2009 | Realini |
| 2009/0124273 A1 | 5/2009 | Back |
| 2009/0143104 A1 | 6/2009 | Loh et al. |
| 2009/0157936 A1 | 6/2009 | Goss et al. |
| 2009/0191812 A1 | 7/2009 | Teruyama et al. |
| 2009/0193491 A1 | 7/2009 | Rao |
| 2009/0199206 A1 | 8/2009 | Finkenzeller et al. |
| 2009/0199283 A1 | 8/2009 | Jain |
| 2009/0200371 A1 | 8/2009 | Kean et al. |
| 2009/0261172 A1 | 10/2009 | Kumar et al. |
| 2009/0265544 A1 | 10/2009 | Moona et al. |
| 2009/0265552 A1 | 10/2009 | Moshir et al. |
| 2009/0287589 A1* | 11/2009 | Fivel ............ 705/28 |
| 2009/0298540 A1 | 12/2009 | Narendra et al. |
| 2009/0307139 A1 | 12/2009 | Mardikar et al. |
| 2009/0307142 A1 | 12/2009 | Mardikar |
| 2009/0319287 A1 | 12/2009 | Hammad et al. |
| 2010/0012721 A1 | 1/2010 | Jain et al. |
| 2010/0023449 A1 | 1/2010 | Skowronek et al. |
| 2010/0044444 A1 | 2/2010 | Jain et al. |
| 2010/0045425 A1 | 2/2010 | Chivallier |
| 2010/0062808 A1 | 3/2010 | Cha et al. |
| 2010/0063893 A1 | 3/2010 | Townsend |
| 2010/0181377 A1 | 7/2010 | Chen et al. |
| 2010/0197224 A1 | 8/2010 | Lahdenniemi et al. |
| 2010/0203870 A1 | 8/2010 | Hubinak et al. |
| 2010/0205432 A1 | 8/2010 | Corda et al. |
| 2010/0213265 A1 | 8/2010 | Narendra et al. |
| 2010/0258639 A1 | 10/2010 | Florek et al. |
| 2010/0264211 A1* | 10/2010 | Jain et al. ............ 235/380 |
| 2010/0274071 A1 | 10/2010 | Florek et al. |
| 2010/0274726 A1 | 10/2010 | Florek et al. |
| 2010/0323617 A1 | 12/2010 | Hubinak et al. |
| 2011/0264543 A1 | 10/2011 | Taveau et al. |
| 2011/0282753 A1 | 11/2011 | Mullen et al. |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1752902 A2 | 2/2007 |
| EP | 1752903 A2 | 2/2007 |
| EP | 1785915 A | 5/2007 |

(56) References Cited

FOREIGN PATENT DOCUMENTS

| | | |
|---|---|---|
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007/034591 | 2/2007 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/041245 | 4/2010 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

Cellular Frequencies, http://en.wikipedia.org/wiki/Cellular_frequencies.*

"Intelligent Mouse", IBM Technical Disclosure Bulletin, International Business Machines Corp., Thornwood, US, Feb. 1, 1995, 38(2), p. 463.

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

"EMV Mobile Contactless Payment: Technical Issues and Position Paper", www.emvco.com/mobile.aspx, © Oct. 11, 2007, accessed Apr. 20, 2009, 37 pages.

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure a Smart Card Alliance Contactless Payments Council White Paper", www.smartcardalliance.org, © Sep. 1, 2007, accessed Nov. 7, 2008, 10 pages.

Madlmayr et al., "Management of Multiple Cards in NFC-Deivces", LNCS, 2008, 21 pages.

* cited by examiner

US 9,081,997 B2

METHOD OF COMMUNICATION WITH THE POS TERMINAL, THE FREQUENCY CONVERTER FOR THE POST TERMINAL

CROSS-REFERENCE TO RELATED APPLICATIONS

This application is the National Stage of International Application No. PCT/IB2009/054457 filed Oct. 11, 2009, which claims the benefit of Slovak Application No. PP 5093-2008, filed Oct. 15, 2008, the disclosures of which are incorporated herein by reference in their entirety.

FIELD OF THE INVENTION

The invention refers to the usage and configuration of a frequency converter for NFC communication with a POS terminal. During direct debit payment the POS terminal communicates in a contactless way with a mobile communication device, such as a mobile phone with a removable card. The invention describes the way data are transmitted between the POS terminal and the mobile communication device using the NFC antenna with a frequency converter.

BACKGROUND OF THE INVENTION

The POS terminals that contain a NFC communication element are commonly used. This element is capable of ensuring contactless communication with the customer's personal device. Along with the increasing number of mobile communication device's functions, the necessity to ensure a reliable communication channel that operates with NFC elements on both sides of the channel also increases. The appropriate solution is considered to be the one that extends functions of the removable card, such as a memory card for the antenna and the NFC communication element function. Since the metal slot for the removable card, along with the hardware's environment, shade the removable card and cause problems in communication on a standard 13.56 MHz frequency, a desirable solution would be such, in which it would be possible to use a different, more suitable frequency without requiring a change in the existing hardware equipment of the POS terminals.

Such a solution is not known at present. The solutions describing common converters are known as in the invention EP 0601091, US 2008/0233906. However existing solutions describe converters which are not practically usable for supplementary extension of existing POS terminals.

There also are solutions as in the DE102007019272A1 file, in which there is a supplementary antenna that is conducted away from the shaded area of the mobile phone. However, these solutions are not suitable for universal usage and complicate the manipulation with a mobile phone. At the moment there is no such data transmission method, that would enable a reliable NFC communication between the POS terminal and the additionally installed NFC communication element in the mobile communication device.

SUMMARY OF THE INVENTION

The deficiencies mentioned are eliminated to a great extent by the way of communication with the POS terminal, in which the contactless payment application is launched over the NFC communication channel using the POS terminal and the mobile communication device, such as a mobile phone, as described by this invention. The subject matter of the invention is based on the fact that there is a frequency converter placed on that side of the communication channel, where there is the POS terminal's NFC antenna. The frequency converter receives the signal from the POS terminal's NFC antenna and sends it on the mobile communication device's frequency and in case of reverse data transmission the frequency converter receives the signal from the mobile communication device and sends it on the frequency of the POS terminal's NFC antenna.

From the simple application's point of view, it is suitable, if the frequency converter is outwardly energetically passive and is supplied with energy from the electromagnetic field received from the POS terminal's antenna. The frequency converter processes a part of the energy radiated by the signal of the POS terminal's NFC antenna, transforms it and sends the signal with original data further on a higher frequency. The rest of the signal radiated from the NFC antenna retains the original frequency.

During data transmission in the direction going from the POS terminal to the mobile communication device, the frequency converter's antenna that is located near the POS terminal's NFC antenna receives the signal from the POS terminal's NFC antenna, processes it in the first modulation and demodulation unit and then sends the data from the received signal to the second modulation and demodulation unit. From there, the data signal is sent over the transmitter on a higher frequency f1, which corresponds to the receiving frequency of the mobile communication device. In case of a reverse data transmission direction, the receiver of the frequency converter receives the signal from the mobile communication device on the frequency f2, processes it in the second amplitude modulation and demodulation unit, then sends the data from the received signal to the first amplitude modulation and demodulation unit, from where subsequently the signal data is sent on the frequency that corresponds to the POS terminal's NFC antenna's frequency—so preferably in the range from 13.00 to 14.00 MHz. The transmitter's frequency f1 can be different from the receiver's f2 frequency in order to avoid mutual disturbance between the transmitted and received signal. The value of the receiver's frequency can be of approximately a half the transmitter's frequency value or of approximately double of the transmitter's frequency value. The transmitter's f1 frequency is the $x^{th}$ multiple of the receiver's f2 frequency or the receiver's f2 frequency is the $x^{th}$ multiple of the transmitter's f1 frequency, while the value of x ranges from 1.75 to 2.45. In preferable configuration, both of the frequencies are the free, unlicensed frequencies defined by the ITU telecommunication union. The receiver's and/or transmitter's frequency can be within the range of 433.05-434.79 MHz or 902-928 MHz or 2.400-2.500 GHz or 5.725-5.875 GHz.

The deficiencies mentioned in the existing technology are to a large extent eliminated also by the frequency converter at the POS terminal for the NFC communication between the POS terminal and the mobile communication device, such as a mobile phone. The frequency converter encompasses an amplitude modulation and demodulation unit, an antenna, a transmitter and a receiver as described in this invention. The subject matter of this invention is based on the fact that the antenna is tuned to the frequency in the range from 13.00 to 14.00 MHz and is connected to the power supply element over the first modulation and demodulation unit. The power supply element is connected to the second modulation and demodulation unit, to which a transmitter and a receiver are connected. The frequency converter is located in the proximity, within the reach of the POS terminal's antenna.

Such an implementation of otherwise known circuit elements enables to receive the NFC signal with data on the basic frequency and to send these data on a different, usually higher frequency. In a preferable configuration, the energetic need of the frequency converter's power supply element is covered exclusively by the energy from the electromagnetic field of the POS terminal's NFC antenna. Due to this, the frequency converter is located in the proximity of the POS terminal's NFC antenna. The POS terminal's NFC antenna is the source of energy even in the case of a reverse data flow, when the frequency converter receives the signal from the mobile communication device and modulates the received data into the original 13.56 MHz frequency signal.

From the point of view of simple usage and placement of the frequency converter it is desirable, if the frequency converter is of flat shape up to 3 mm in thickness, with 1 mm being preferred and if the frequency converter's body is placed next to, preferably affixed to the POS terminal's reader. The frequency converter can be formed as a sticker that is affixed to the plastic cover of the POS terminal's NFC reader in the place, under which there is the POS terminal's NFC antenna.

In order to ensure sufficient power supply for the frequency converter, it is suitable, if the frequency converter is located in such a way, in which the frequency converter's antenna is close to the POS terminal's antenna. The center of mass of the frequency converter's antenna surface is at a 20 mm distance from the center of mass of the POS terminal's antenna surface. In the configuration described, given to the frequency convertor, the signal from the POS terminal is radiated on a new frequency and also on an original 13.56 MHz frequency. This is possible, since the frequency converter can be proportioned in such a way, that 10 to 30% of the radiated signal from the original electromagnetic field is converted to a new frequency. The frequency converter's body does not shade the signal's energy 70 to 90% surplus of the POS terminal's NFC antenna. This part permeates on an original frequency. This offers a possibility for both the existing NFC communication elements along as the communication device with a different, usually higher frequency to communicate with the POS terminal.

The high-frequency signal has substantially higher permeability through the environment and on the mobile communication devices side it is possible to locate an antenna, respectively two antennas directly on the removable card inserted into the mobile communication device. The value of the receiver's frequency can be of approximately a half the transmitter's frequency value or of approximately double of the transmitter's frequency value. In preferable solution, both frequencies are free, unlicensed frequencies as are the frequencies in the range 433.05-434.79 MHz or 902-928 MHz or 2.400-2.500 GHz or 5.725-5.875 GHz.

Since the frequency converter after being affixed to the POS terminal's NFC reader can cover the original symbol showing the customer, where he should approach his mobile communication device when authorizing the payment, it is suitable if the frequency converter's body is equipped with a target symbol. This one is placed on the frequency converter body surface, which is opposite to the surface with adhesive layer.

The frequency converter described and the way of communication with the POS terminal over the frequency converter enables the common POS terminal to communicate with the mobile communication device on a significantly higher frequency while retaining the common communication channel with the 13.56 MHz frequency. The frequency converter is passive; it does not require to be supplied with energy; its' body is flat; all of which enables its easy implementation on the easily accessible place on the outside of the POS terminal, without the necessity of connecting any cables. The frequency converter implementation uses free, unlicensed frequencies on the mobile communications side. The higher frequencies have better penetration through the surroundings and enable to use an antenna placed on the removable card in the mobile communication device's side. The solution describes is constructionally simple and enables mass and comfortable adjustments to existing POS terminals.

BRIEF DESCRIPTION OF THE DRAWINGS

The invention is explained in more detail on the pictures 1 to 3. On the picture 1, there is a typical scheme of the frequency converter's implementation. On the picture 2, there is a configuration that is typical between the mobile phone and POS terminal in contactless communication.

The picture 3 display is block and scheme the data transmission process with the radiation of electromagnetic fields from the POS terminal's antenna.

REALIZATION EXAMPLES

Example 1

Figure 1:
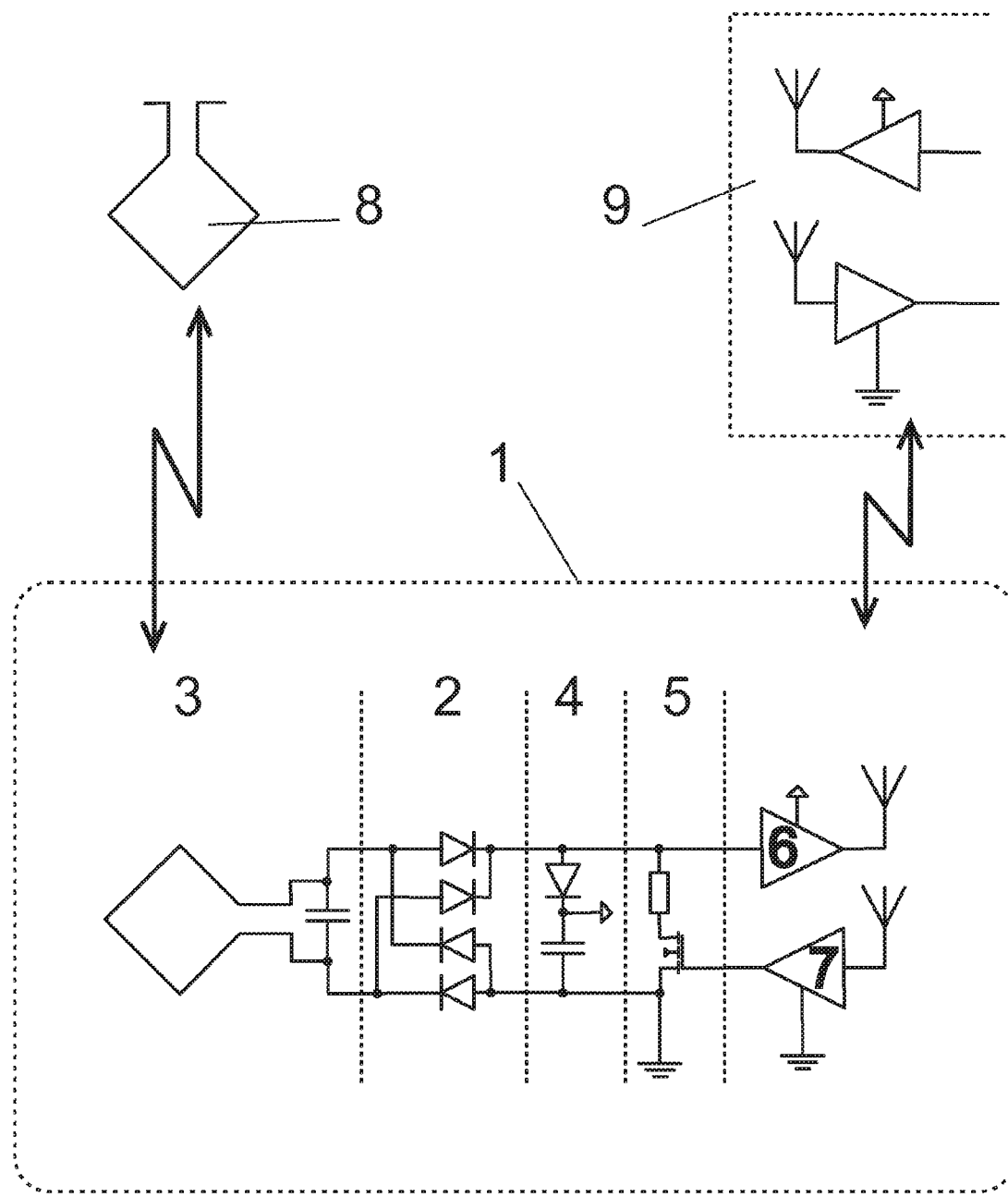
Figure 2:
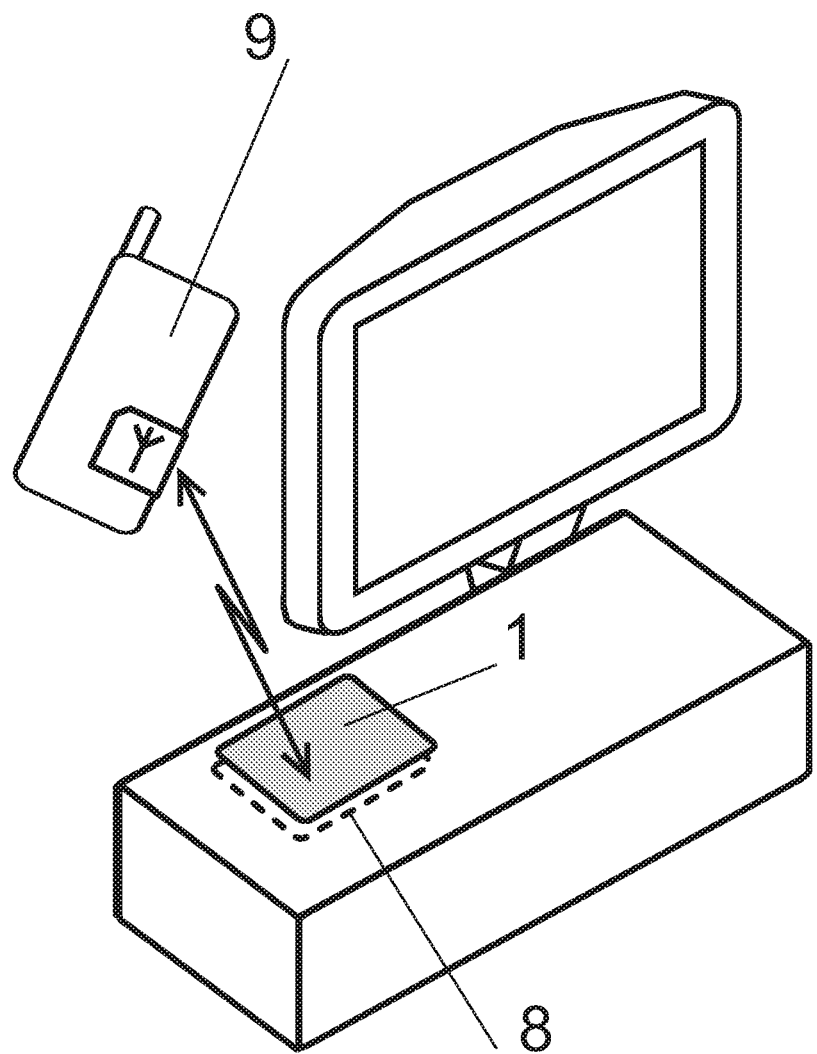
Figure 3:
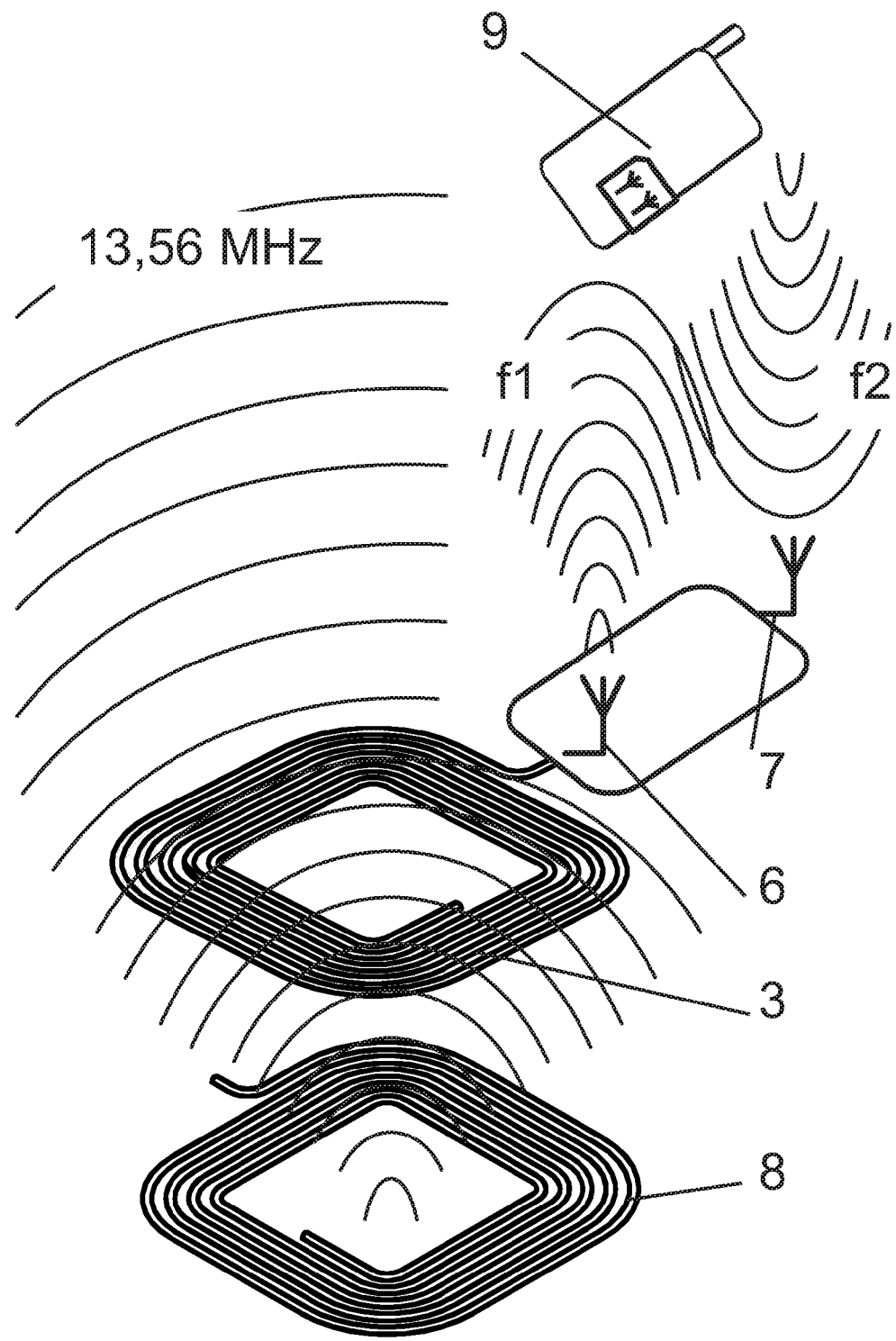

The frequency converter 1 is of the credit card's parameters being 0.8 mm thick. The shape of the frequency converter 1 basically copies the rectangular shape of the POS terminal's NFC antenna 8. The frequency converter 1 has an antenna 3 tuned to the frequency in the range between 13.00 and 14.00 MHz. The frequency converter's antenna 3 is located on that side of the frequency converter that is designed to be affixed to the POS terminal's NFC antenna's cover. This side of its' body is equipped with adhesive layer. The first modulation and demodulation unit 2 is connected to the frequency converter's antenna 3 and to the power supply element 4. The first modulation and demodulation unit 2 is formed by the diode bridge. The power supply element 4 encompasses a common connection between the stabilizer with a diode and capacitor. This solution receives electrical energy from the electromagnetic field received by the frequency converter's 1 antenna 3. The power supply element 4 ensures power supply to all frequency converter's 1 circuits, due to which the frequency converter 1 appears outwardly to be a passive element without the need of external power supply. The power supply element 4 is connected to the second modulation and demodulation unit 5 into which the data input is entered from the first modulation and demodulation unit 2. The transmitter 6 and the receiver 7 are connected to the second modulation and demodulation unit 5. The second modulation and demodulation unit 5 encompasses a resistor and a FET. In this example the transmitter's 6 f1 frequency is 2.400 GHz; the receiver's 7 f2 frequency is 5.725 GHz. The communication elements on the side of the SD memory card, that is inserted into the mobile communication device's 9, mobile phone's slot, are tuned to these f1, f2 frequencies.

The frequency converter 1 is affixed on the outside plastic cover of the POS terminal's reader in the place and in such a way, that the frequency converter's 1 antenna 3 is adjacent to the POS terminal's NFC antenna 8 and the center of mass of the frequency converter's 1 antenna 3 is located in 10 mm distance from the center of mass of the POS terminal's NFC antenna 8 surface.

The first modulation and demodulation unit 2 processes, demodulates and funnels the signal received by the frequency converter 1. The funneled signal is also used to power supply all the electronic circuits of the solution described. The demodulated data are received by the second modulation and demodulation unit 5 from where they are sent over the transmitter 6, to the mobile communication device 9. The signal emitted on the 2.400 GHz frequency is received by the receiver on the SD memory card and subsequently demodulated to data itself which then enter the mobile communication device 9.

In case of reverse flow, the data are modulated into the signal and sent on the unlicensed 5.725 frequency by the receiver within the SD memory card. This signal is received by the frequency converter's 1 receiver 7 and processed in the second modulation and demodulation unit 5. The data within the signal are sent into the first modulation and demodulation unit 2, where they are amplitudely modulated into the signal. The signal with the data is sent to the POS terminal's NFC reader over the frequency converter's 1 antenna 3 with the 13.56 MHz frequency.

Example 2

The frequency converter 1 in this example has a body that is 0.5 mm thick and has a shape of a circle combined with a rectangle. The circle's diameter is 70 mm and within it, there is an antenna 3. In the rectangular part, the elements are connected in the same way as in the example 1. The antenna 3 is tuned to the frequency of 13.56 MHz. The transmitter's 6 f1 frequency is 5.875 GHz, the receivers 7 f2 frequency is 2.500 GHz. The frequency converter 1 is in the form of a sticker, that is equipped with an adhesive layer with protection paper on one side and on the other side it has a guide sign in the form of a target.

INDUSTRIAL APPLICABILITY

The industrial applicability is obvious. According to this invention it is possible to produce and use the frequency converter repeatedly. The frequency converter is able to change the original frequency of the communication element to a more suitable, higher frequency, while the original communication channel is retained as well. According to this invention it is also possible to secure the communication with the POS terminal over frequency converter.

LIST OF RELATED SYMBOLS

1—a frequency converter
2—the first modulation and demodulation unit (amplitude demodulator)
3—the frequency converter's antenna
4—a power supply element
5—the second modulation and demodulation unit (the transmitting modulator)
6—a transmitter
7—a receiver
8—the POS terminal's NFC antenna
9—a mobile communication device
f1—the transmitter's frequency
f2—the receiver's frequency

The invention claimed is:

1. A system for contactless payment via a mobile communication device, the system comprising:
a point-of-sale (POS) terminal having a near-field communication (NFC) antenna;
a removable memory card inserted in a respective slot of the mobile communication device, the removable memory card having an antenna; and
a frequency converter positioned between the removable memory card and the NFC antenna of the POS terminal, the antenna on the removable memory card being tuned for communication with the frequency converter,
wherein the frequency converter is a flat object in a shape of a sticker and is placed in range of the POS antenna and is adapted to receive a first signal from the NFC antenna of the POS terminal, to convert the first signal to a frequency suitable for reception by the removable memory card in the mobile communication device, and to communicate the converted first signal to the removable memory card in the mobile communication device,
wherein the frequency converter is further adapted to receive a second signal from the removable memory card in the mobile communication device, to convert the second signal to a frequency suitable for reception by the NFC antenna of the POS terminal, and to communicate the converted second signal to the NFC antenna of the POS terminal,
wherein the frequency converter is outwardly energetically passive and is powered by an electromagnetic field on a communication path between the mobile communication device and the NFC antenna of the POS terminal, said electromagnetic field being received from the NFC antenna of the POS terminal, and
wherein the flat object of the frequency converter is placed on the outside surface of the POS terminal antenna and a center of mass of a surface of the frequency converter antenna is at a distance of less than 20 mm from a center of mass of a surface of the POS terminal antenna.

2. The system of claim 1, wherein the frequency converter includes an antenna that receives the first signal from the NFC antenna of the POS terminal, processes the received signal in a first modulation and demodulation unit, sends data from the received signal into a second modulation and demodulation unit, from where the data signal is sent over a transmitter on a higher frequency that corresponds to a receiving frequency of the mobile communication device.

3. The system of claim 2, wherein the frequency converter includes a receiver that is adapted to receive a signal from the mobile communication device on a first frequency, to process the received signal in the second modulation and demodulation unit, to send data from the received signal into the first modulation and demodulation block, from where the data signal is sent via the frequency converter antenna using the frequency that corresponds to the frequency of the NFC antenna of the POS terminal.

4. The system of claim 3, wherein the transmitter operates at a frequency that is different from a frequency at which the receiver operates.

5. The system of claim 4, wherein the transmitter and the receiver each operates at a frequency of 433.05-434.79 MHz, 902-928 MHz, 2.400-2.500 GHz, or 5.725-5.875 GHz.

6. The system of claim 4, wherein the frequency at which the transmitter operates is an xth multiple of the frequency at which the receiver operates, or the frequency at which the receiver operates is an xth multiple of the frequency at which the transmitter operates, and x has a value of 1.75 to 2.45.

7. A method for near-field communication (NFC) between a point-of-sale (POS) terminal and an antenna on a removable memory card in a mobile communication device, the POS terminal having an NFC antenna, the method comprising:
locating a frequency converter within a flat object in a shape of a sticker on the outside surface of the POS terminal in proximity to the NFC antenna of the POS terminal such that the frequency converter is supplied with energy from an electromagnetic field generated by the NFC antenna of the POS terminal during transmission of data from the POS terminal to the mobile communication device, wherein the flat object of the frequency converter is placed on the outside surface of the POS terminal antenna and a center of mass of a surface of the frequency converter antenna is at a distance of less than 20 mm from a center of mass of a surface of the POS terminal antenna;

receiving at the frequency converter a first signal containing first data transmitted from the NFC antenna of the POS terminal, the first signal having a first transmission frequency; and transmitting from the frequency converter to the antenna on the removable memory card in the mobile communication device, a second signal containing the first data, the second signal having a second transmission frequency that is higher and differs from the first transmission frequency.

8. The method of claim 7, further comprising:

receiving at the frequency converter a third signal containing second data transmitted from the mobile communication device, the third signal having a third transmission frequency that is different from the first and second frequencies and wherein the second frequency is an xth multiple of the third frequency, or the third frequency is an xth multiple of the second frequency, and x has a value of 1.75 to 2.45.

9. The method of claim 8, further comprising:

transmitting from the frequency converter to the antenna of the POS terminal, a fourth signal containing the second data, the fourth signal having a fourth transmission frequency that is the same as the first transmission frequency.

* * * * *